UNITED STATES PATENT OFFICE.

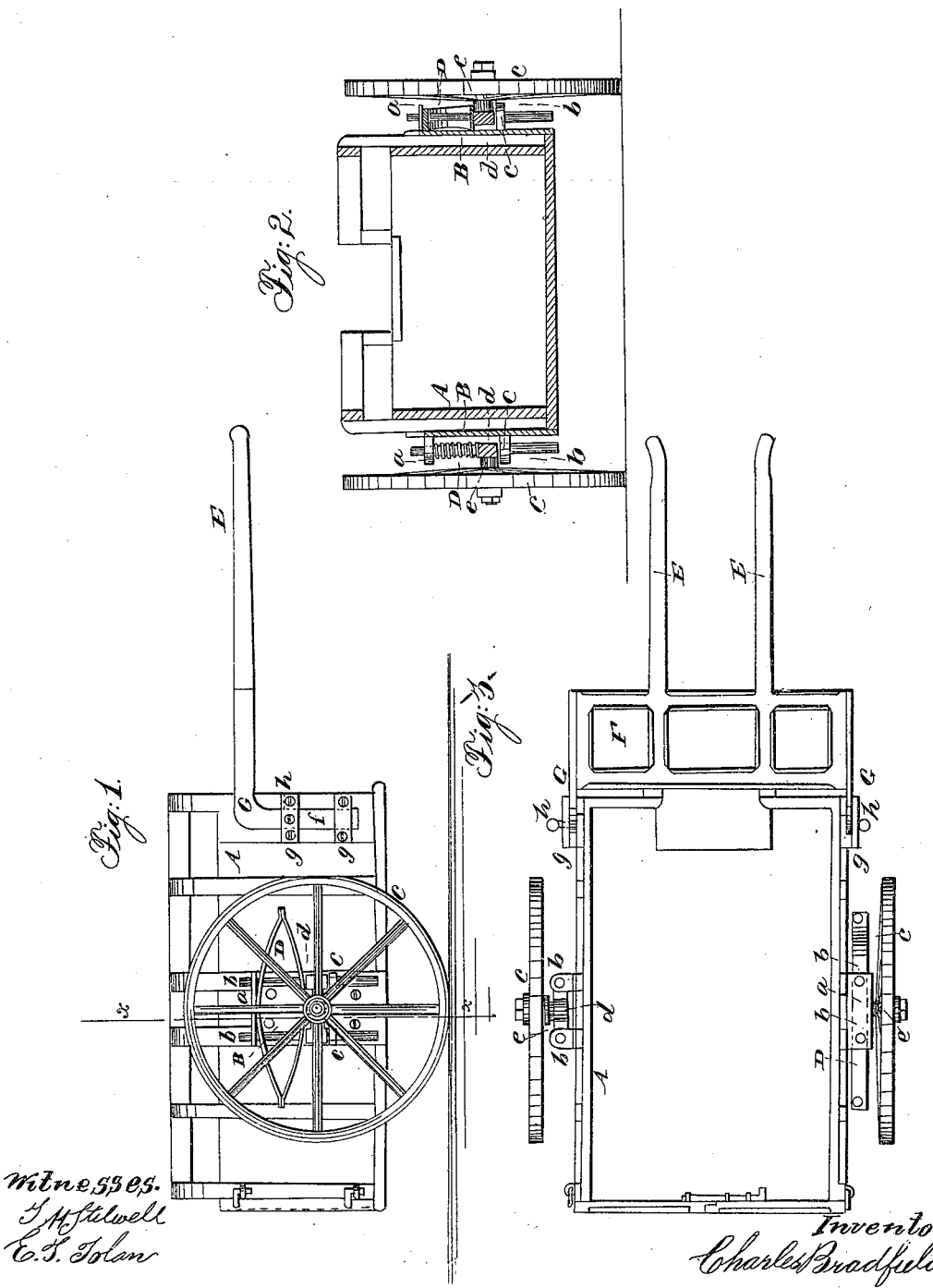

CHARLES BRADFIELD, OF PHILADELPHIA, PENNSYLVANIA, ASSIGNOR TO C. STEWART BRADFIELD, OF SAME PLACE.

HANGING THE BODIES OF WHEEL-VEHICLES.

Specification of Letters Patent No. 25,158, dated August 16, 1859.

*To all whom it may concern:*

Be it known that I, CHARLES BRADFIELD, of Philadelphia, in the county of Philadelphia and State of Pennsylvania, have invented certain new and useful Improvements in Wheel-Vehicles; and I do hereby declare that the following is a full, clear, and exact description of the same, reference being had to the annexed drawings, making a part of this specification, in which—

Figure 1, is a side view of a cart of two wheel vehicle constructed according to my invention. Fig. 2, is a transverse vertical section of the same, taken in the line $x$, $x$, Fig. 1. Fig. 3, a plan or top view of the same.

Similar letters of reference indicate corresponding parts in the several figures.

This invention consists in a novel way of attaching the wheels of the vehicle to its body as hereinafter fully shown and described, whereby the body may be placed quite low or near the earth and at the same time wheels of large diameter be employed in connection with springs.

The invention also consists in a novel way of attaching the thills to the vehicle, whereby they may be readily adjusted higher or lower to suit the height of the draft animal between them.

To enable those skilled in the art to fully understand and construct my invention I will proceed to describe it.

A, represents the body of a cart or two wheel vehicle. This body is of rectangular form and to each side of it a metal plate B, is attached, by screws or bolts, said plates being attached about at the centers of the sides of the body. The upper ends of these plates have each a flanch $a$, on them, said flanches projecting outward at right angles from the plates and having holes made in them to allow shafts or arbors $b$, $b$, to pass through, said shafts or arbors also passing through bearings $c$, $c$, attached to the plates. The shafts or arbors $b$, $b$, are allowed to slide freely in the bearings $c$, $c$, and flanches $a$, $a$, and to the shafts or arbors of each plate B, a traverse bar $d$, is attached, and to these bars $d$, arms $e$, are secured on which the wheels C, C, are placed. Between the traverse bars $d$, and the flanches $a$, of the plates B, springs D, are placed, and the body A, is sustained by these springs which give it a necessary yielding movement, the flanches $a$, and bearings $c$, $c$, rising and falling on the shafts or arbors $b$, $b$. Any suitable form of springs may be used—elliptic, spiral or india rubber. In Fig. 2, a spiral spring is shown applied to the traverse bar $d$, of one pair of shafts or arbors and an elliptic spring to the other. By this arrangement it will be seen that large wheels may be applied to the body A, in connection with springs and the body brought quite low or near the ground and a very durable vehicle obtained, far more so than if constructed with a bent axle as has hitherto been done in order to bring the body near the ground. By this arrangement also a much cheaper vehicle can be built than usual.

The invention although applicable to all wheel vehicles is more especially designed for box or express wagons, carts, etc.

E, represents the thills of the vehicle. These thills may be constructed in the usual way. The back parts of the thills however are attached to a frame F, which is equal in width to the body A, as shown clearly in Fig. 3. To each side of the frame F, a metal bar G, is attached. These bars are of right angular form and their vertical portions $f$, fit within metal eyes $g$, attached to the sides of the body. In the upper eyes $g$, set screws $h$, pass by which the bars G, and consequently the thills may be secured at any desired height as circumstances may require.

Having thus described my invention what I claim as new and desire to secure by Letters Patent, is,

1. Attaching the wheels C, to the body A, by means of the arms $e$, secured to the traverse bars $d$, of the shafts or arbors $b$, $b$, which are fitted in the flanches $a$, and bearings $c$, $c$, of the plates B, of the body A, and have springs D, placed between their flanches $a$, and traverse bars $d$, substantially as and for the purpose set forth.

2. Attaching the thills E, to the body A, by means of the bars G, fitted in the eyes $g$, and secured thereon at the desired height by set screws $h$, substantially as described.

CHARLES BRADFIELD.

Witnesses:
T. H. STILWELL,
E. T. TOLAN.